Dec. 26, 1922.
H. MILES.
LICENSE PLATE HOLDER.
FILED APR. 8, 1922.
1,440,310.
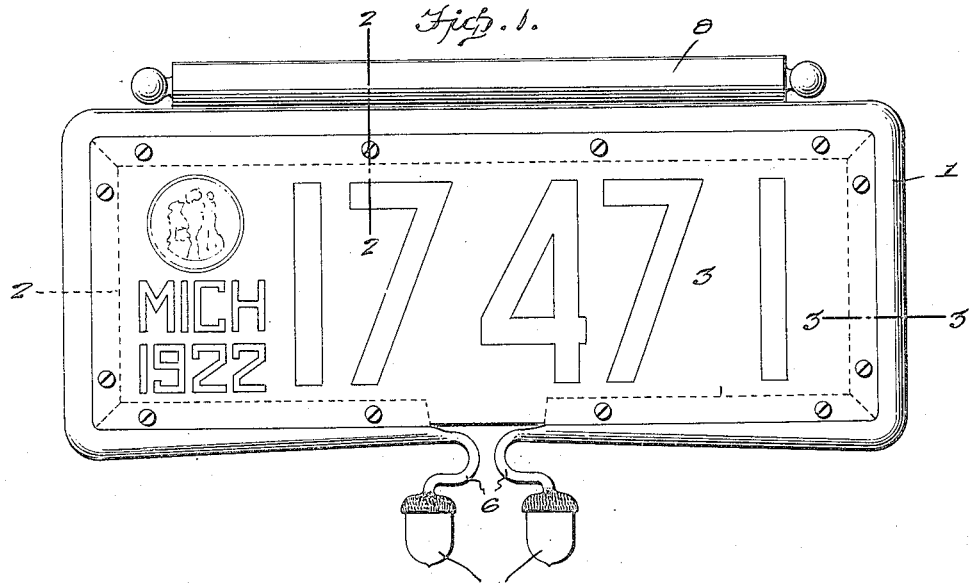
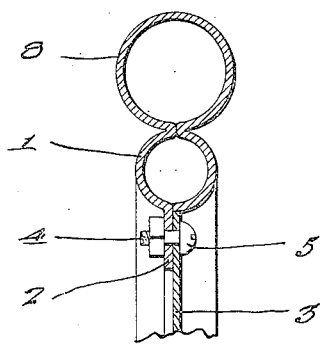
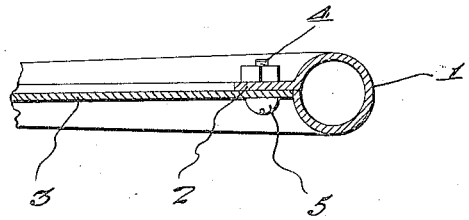
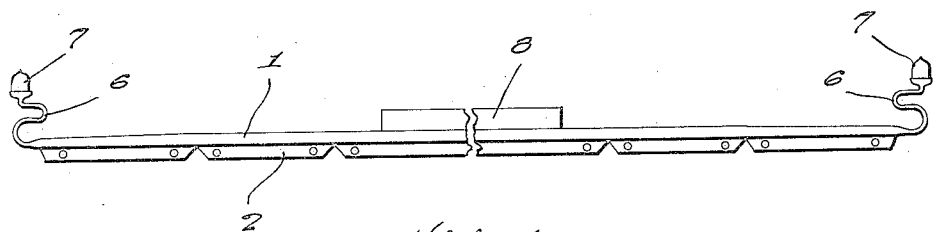
Harvey Miles
INVENTOR Patented Dec. 26, 1922.

1,440,310

UNITED STATES PATENT OFFICE.

HARVEY MILES, OF DETROIT, MICHIGAN.

LICENSE-PLATE HOLDER.

Application filed April 8, 1922. Serial No. 550,770.

*To all whom it may concern:*

Be it known that I, HARVEY MILES, a citizen of the United States, residing at Detroit, in the county of Wayne and State of Michigan, have invented new and useful Improvements in License-Plate Holders, of which the following is a specification.

My present invention has reference to a frame primarily devised for use in connection with the license plates of automobiles, but, of course, susceptible to other uses.

My primary object is to produce an elastic frame which may be attached to license plates, or the like of varying sizes, and which shall be of an ornamental nature.

The foregoing, and other objects which will present themselves as the nature of the invention is better understood, may be accomplished by a construction, combination and association of parts such as is disclosed by the drawing which accompanies and forms part of this specification.

In the drawing:—

Figure 1 is a view illustrating an automobile license plate mounted in a frame in accordance with this invention.

Figure 2 is a greatly enlarged sectional view approximately on the line 2—2 of Figure 1.

Figure 3 is a similar sectional view on the line 3—3 of Figure 1.

Figure 4 is a plan view of the frame before the same is arranged around the license plate.

As disclosed by the drawing, my frame for license plates or the like comprises a member which is centrally bent upon itself and therefore is substantially U-shaped in cross section, and which is indicated by the numeral 1. The flanges 2 of the member 1, at determined intervals are provided with V-shaped notches whereby the said member may be arranged around a license plate 3, to conform to the shape of the said plate. The member 1 is of a nature sufficiently elastic and of an inherent resiliency whereby the same may be arranged upon varying sizes of license plates or the like and also whereby the frame will effectively grip the plate. The frame, of course, is arranged around the edges of the plate, and the flanges 2 thereof at predetermined intervals have openings therethrough designed to align with similar openings in the plate 2. Passing through all or certain of these openings are bolts 4 which have ornamental heads 5. The bolts have their shanks engaged by nuts.

In the ends of the substantially U-shaped flexible frame there are secured wire members 6 that have their outer ends provided with ornamental heads 7.

The frame, at the center thereof has integrally formed therewith a cross sectionally rounded member or barrel 8, and this barrel is designed to receive therein means whereby the device is supported on an automobile.

It is thought that the foregoing description, when taken in connection with the drawings will fully set forth the construction to those skilled in the art to which such inventions relate, and that further detailed description will not be required.

Having described the invention, I claim:—

The combination with a license plate or the like, of a frame therefor, comprising a member having an inherent flexibility and resiliency and which is substantially U-shaped in cross section, said member having its sides provided with spaced V-shaped notches, whereby the same may be arranged around the corners of the plate when the edges of the plate are received in the frame, wire members projecting through the ends of the frame, ornamental elements on the ends of the wire members, and a barrel centrally formed on the frame.

In testimony whereof I affix my signature.

HARVEY MILES.